United States Patent
Kekäläinen

(12) 
(10) Patent No.: US 9,930,429 B2
(45) Date of Patent: Mar. 27, 2018

(54) METHOD AND SYSTEM FOR MONITORING AND COMMUNICATING FILL RATE OF CONTAINER

(71) Applicant: Enevo Oy, Espoo (FI)

(72) Inventor: Fredrik Kekäläinen, Espoo (FI)

(73) Assignee: Enevo Oy, Espoo (FI)

( * ) Notice: Subject to any disclaimer, the term of this patent is extended or adjusted under 35 U.S.C. 154(b) by 0 days.

(21) Appl. No.: 14/535,041

(22) Filed: Nov. 6, 2014

(65) Prior Publication Data

US 2016/0134949 A1     May 12, 2016

(51) Int. Cl.
*H04Q 9/00* (2006.01)
*G01F 23/00* (2006.01)

(52) U.S. Cl.
CPC ............... *H04Q 9/00* (2013.01); *G01F 23/00* (2013.01); *B65F 2210/128* (2013.01); *B65F 2210/1443* (2013.01); *B65F 2210/184* (2013.01); *B65F 2210/20* (2013.01)

(58) Field of Classification Search
CPC ......... B30B 13/00; B30B 15/18; B30B 15/04; B30B 9/3057; B30B 9/3007; B30B 9/3042; B65F 1/14; B65F 2210/128; B65F 2210/1443; B65F 2210/184; B65F 2210/20; G01F 23/00; G01F 11/00; G01F 11/006; G01F 11/10; G01F 11/26; G01F 11/28; G01F 15/06; G01F 17/00; G01F 22/00; G01F 23/0061–23/0092; G01F 23/20; G01F 23/205; G01F 23/292; G01F 23/296; G01F 23/30; G01F 23/36; G01F 25/00; G08B 21/00; G06Q 10/00; G06Q 10/06; G06Q 10/30; G06Q 10/0631; G06T 7/00; G06T 7/0008; H04Q 9/00
USPC .................................. 340/601–626
See application file for complete search history.

(56) References Cited

U.S. PATENT DOCUMENTS

| | | | |
|---|---|---|---|
| 8,794,135 B1* | 8/2014 | Simon | B30B 9/3057 100/269.01 |
| 2002/0077875 A1* | 6/2002 | Nadir | G06Q 10/08 705/39 |
| 2009/0261981 A1* | 10/2009 | Jones | G06Q 10/06 340/666 |
| 2010/0138766 A1* | 6/2010 | Nakajima | G06F 1/1626 715/767 |
| 2013/0278067 A1* | 10/2013 | Poss | B65F 1/0033 307/62 |

(Continued)

FOREIGN PATENT DOCUMENTS

FR      20030006054 A1    11/2004

*Primary Examiner* — Brian Wilson
(74) *Attorney, Agent, or Firm* — Ziegler IP Law Group, LLC

(57) ABSTRACT

Disclosed is a method for monitoring a fill rate of a container and communicating it, which container comprises at least a first sensor which is a fill rate sensor. The method comprises receiving an operational model from a server, comprising a predefined maximum and/or minimum value of the fill rate. The method also comprises measuring the fill rate of the container. The method further comprises comparing the measured fill rate with the operational model. The method also comprises communicating the fill rate to the server, if the fill rate is equal or above the predefined maximum fill rate and/or if the fill rate is equal or below the predefined minimum fill rate.

15 Claims, 6 Drawing Sheets

(56) References Cited

U.S. PATENT DOCUMENTS

2014/0172174 A1* 6/2014 Poss .................. G05B 15/02
700/275
2014/0278630 A1* 9/2014 Gates ................ G06Q 10/047
705/7.13

* cited by examiner

METHOD AND SYSTEM FOR MONITORING AND COMMUNICATING FILL RATE OF CONTAINER

TECHNICAL FIELD

The present disclosure relates generally to a wireless monitoring and communication methods and systems; and more specifically, to methods and systems for monitoring and communicating a fill rate of a container in a power efficient manner.

BACKGROUND

Use of garbage containers can be seen in almost all commercial and residential places. Such garbage containers are required to be periodically emptied or cleaned. Typically, maintenance personnel associated with such cleaning or emptying job use trucks for emptying such garbage containers. The maintenance personnel have scheduled routes and limited time to run the trucks for emptying garbage containers of various localities. In order to make the entire process of garbage collection efficient, it is desirable to know fill levels of the garbage containers so as to ensure timely cleanliness of such garbage containers. For example, the fill level information can help in designing a route and scheduling time for emptying garbage containers of a particular locality. Also, having the ability to predict a proper emptying time for a garbage container helps the garbage collector to plan the route of the garbage collector truck to reduce costs related to the whole garbage collection process.

In order to address such issues, nowaday's garbage containers are often equipped with a gauge that is configured to monitor a fill level of the garbage container and communicate the same to a remote server. The server receives and processes the fill level data to design an efficient route and schedules time for emptying garbage container of a particular locality. However, such gauges require continuous monitor of the fill level and communication of the same to the server. For example, at least one communication is scheduled between the gauge and the server every day for sending the fill level data to the server. Typically, such communications are made irrespective of the fill level of the container, i.e. the gauge communicates with the server even if the container is half filled. Therefore, such communications are undesirable as they consume a substantial amount of battery power of the gauge and do not provide any critical data. As a result, the battery of the gauge is either required to be replaced in quick succession due to such undesirable communications or requires employment of heavier duty battery for a longer operation of such gauges.

Therefore, in light of the foregoing discussion, there exists a need to overcome the aforementioned drawbacks of undesirable communications generally performed between a gauge and a server in the process of determining a fill level of a container.

SUMMARY

The present disclosure seeks to provide a method for monitoring and communicating a fill rate of a container.

The present disclosure also seeks to provide a system for monitoring and communicating a fill rate of a container.

In one aspect, an embodiment of the present disclosure provides a method for monitoring a fill rate of a container and communicating it, which container comprises at least a first sensor which is a fill rate sensor. The method comprises steps of:

receiving an operational model from a server, comprising a predefined maximum and/or minimum value of the fill rate;

measuring the fill rate of the container;

comparing the measured fill rate with the operational model; and communicating the fill rate to the server, if the fill rate is equal or above the predefined maximum fill rate, and/or the fill rate is equal or below the predefined minimum fill rate.

In another aspect, an embodiment of the present disclosure provides a system for monitoring a fill rate of a container and communicating it. The system comprises a gauge mounted on the container. The gauge comprises at least a first sensor which is a fill rate sensor. The system also comprises a server communicably coupled to the gauge to provide an operational model to the gauge, the operational model having predefined maximum and/or minimum value of the fill rate. Based on the operational model the gauge is configured to measure the fill rate of the container, compare the measured fill rate with the operational model; and communicate the fill rate to the server, if the fill rate is equal or above the predefined maximum fill rate, and/or the fill rate is equal or below the predefined minimum fill rate.

Embodiments of the present disclosure substantially eliminate or at least partially address the aforementioned problems in the prior art, and enable monitoring and communicating a fill rate of a container by a gauge in a power efficient manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
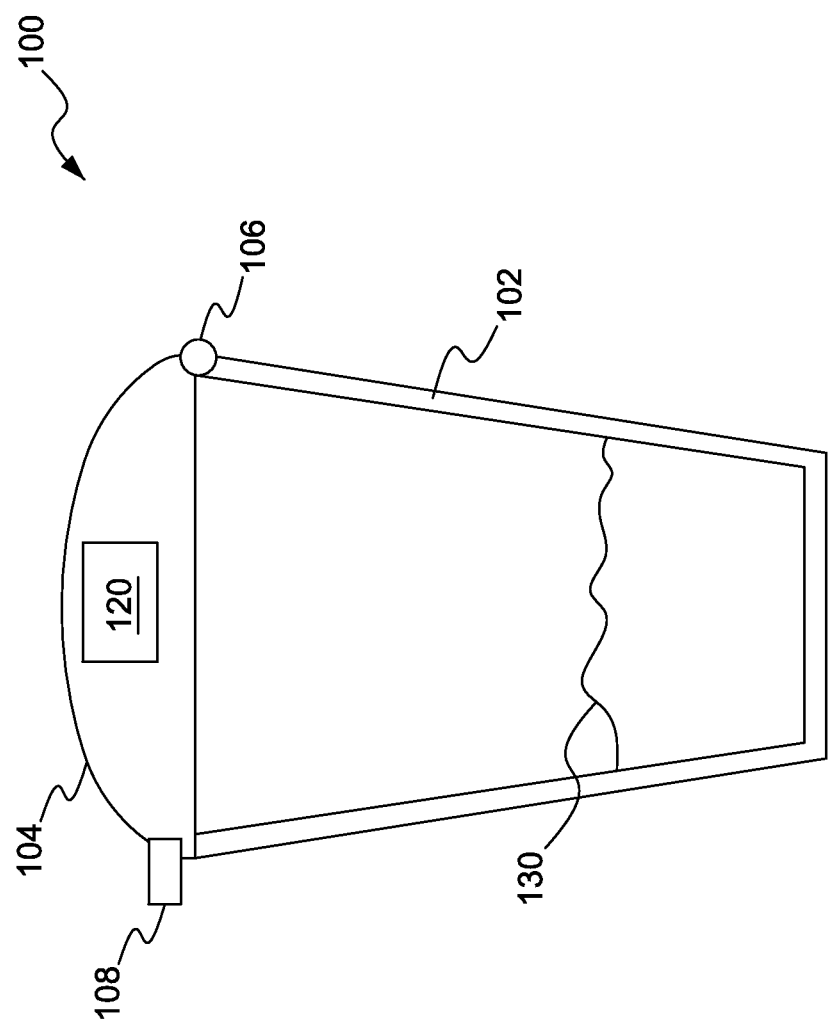
FIG. 1 is a schematic illustration of a garbage container; in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a method for monitoring a fill rate of a container and communicating it, which container comprises at least a first sensor which is a fill rate sensor, the method comprising steps of:

receiving an operational model from a server, comprising a predefined maximum and/or minimum value of the fill rate;

measuring the fill rate of the container;

comparing the measured fill rate with the operational model; and communicating the fill rate to the server, if the fill rate is equal or above the predefined maximum fill rate, and/or the fill rate is equal or below the predefined minimum fill rate.

In another aspect, an embodiment of the present disclosure provides a system for monitoring and communicating a fill rate of a container. The system comprises a gauge mounted on the container. The gauge comprises at least a first sensor which is a fill rate sensor. The system also comprises a server communicably coupled to the gauge to provide an operational model to the gauge. The operational model has predefined maximum and/or minimum value of the fill rate. Based on the operational model, the gauge is configured to measure a fill rate of the container, compare the measured fill rate with the operational model and communicate the fill rate to the server, if the fill rate is equal or above the predefined maximum fill rate and/or the fill rate is equal or below the predefined minimum fill rate.

In one embodiment, the container is a garbage container used for temporarily collecting garbage or trash therein. The garbage container can be assigned to a particular locality for collecting the garbage in and around that locality. The garbage container includes a hollow body for collecting garbage therein and a lid for closing the body. The garbage container can be a garbage bin (having various sizes of about 20 to 100 Gallon) or a garbage cart (having various sizes of about 2 to 8 yards). The garbage container is periodically emptied or cleaned by maintenance personnel. For example, the garbage container may be associated with a specific route and scheduled time defined for emptying thereof.

In one embodiment, the container comprises the gauge mounted on the lid thereof. Alternatively, the gauge may be mounted on a substantially upper portion of the body of the container. Further, the gauge is preferably mounted in a non-obstructive manner, such that the gauge does not obstruct garbage from being collected into the body.

As explained above, the gauge comprises at least a first sensor, which is the fill rate sensor. According to an embodiment, the fill rate sensor is selected from the group consisting of ultrasonic sensor, infrared sensor, pressure sensor, weight sensor, ultra wideband radar sensor, CCD camera sensor and laser sensor.

According to an embodiment, the gauge also comprises other sensors in addition to the fill rate sensor. For example, the gauge comprises at least a second sensor. The second sensor can be selected from a group consisting of ultrasonic sensor, accelerometer, humidity sensor, gas sensor, ambient light sensor and temperature sensor.

In addition to above, the gauge may also comprise a microcontroller with embedded memory for a program data and data storage, a wireless transceiver and antenna typically operating on Global System for Mobile communication (GSM) or similar cellular standard. The gauge preferably also comprises a battery for powering the sensors, the microcontroller and the wireless transceiver. The battery can be an industrial grade Li-Ion battery. Further, the gauge, particularly the microcontroller, preferably includes a clock function, i.e. a real time clock.

In one embodiment, the gauge is a sealed device, such that, the gauge cannot be opened for tampering. Further, in case of any malfunction, the damaged gauge may be replaced with a new gauge.

The system of present disclosure preferably comprises a plurality of such gauges adapted to be mounted on various garbage containers belonging to different localities.

The plurality of gauges may be coupled to the server via one or more communication networks. The communication network can be a wired, wireless, or a combination thereof. Examples of such communication network includes, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

According to an embodiment, the server is operable to provide operational models to the gauges. The server may comprise a program code that makes the server to connect with the gauges for providing the operational models. The program code also makes the server operable to exchange data with the gauges and design operational models for the gauges, which is explained in greater detail herein later. Additionally, the server may be operable to store received data from the gauges, i.e. the server may include a database for storing the received data.

The system of the present disclosure also preferably comprises a user device operatively coupled to the server. The user device is operable to control the server and exchange data with the server. The server provides a user interface on the user device for controlling and monitoring the operation of the server. In an example, the user device may be a computing device which includes but is not limited to a laptop or a desktop.

The operational models provided to the gauges may be different from each other. Specifically, each operational model typically contains different set of instructions defining different patterns of operation for the gauges.

According to an embodiment, an operational model is calculated or designed based on various external parameters (independent of gauge measurement data). The parameters include but are not limited to a gauge type and capabilities, physical coordinates of the installation of the gauge and customer agreement related the container use.

Additionally, an operational model may be calculated by analyzing gauge measurement data over a period of time, which is explained in detail herein later.

Optionally, an operational model is calculated based on both external parameters and analyzed data collected from the gauge.

The gauges of the present disclosure are designed for low power operation, i. e. the microcontrollers thereof typically stay in sleep mode (i.e. not in communication with the server) until they receive a wake-up signal from at least one of the sensor or the clock function as defined in the operational model.

According to an embodiment, the sensors of the gauges measure data and transmit the measurement data to the server only when one or more measured data is out of allowed ranges (as defined in the operational model). The allowed ranges of sensor data that generate wake-up signals are defined in the operational model. For example, when a gauge is mounted on a lid of a residential single-house garbage container, in such instance, a wake-up signal can be set to 3G, which in this case is a minimum acceleration when the lid is closed. Alternatively, a more complex definition of wake-up signal can be defined, such as, temperature above a threshold for a certain time period and the like, which will be explained in detail herein later.

According to an embodiment, the operational model comprises a predicted fill rate of the container as a function of time. The predicted fill rate may be expressed in number of days, i.e. the garbage container is expected to be filled as per the defined number of days. For example, if a garbage container generally fills at a rate of 10% every day, then the predicted fill rate of the container would be 10 days, when the container is expected to the completely filled. Therefore, the operational model can include a predicted fill rate of 8 days or 9 days, when the container is expected to be filled by 80% or 90%, respectively. Accordingly, the gauge would communicate with the server after 8 or 9 days based on such operational model.

Based on above operational model, the clock function of the gauge wakes up the microcontroller from the sleep mode after 8 or 9 days. This would instruct the transceiver of the gauge to transmit a fill rate data to the server.

According to an embodiment, the operational model further comprises a predefined measurement schedule and a predefined communication schedule. The predefined measurement schedule and the predefined communication schedule are also a function of time, however, such schedules may be associated with an uneven time line instead of an even time line.

Based on the predefined measurement schedule the gauge, particularly the sensors thereof, may measure various data (such as for example fill rate data, accelerometer data, humidity data, ambient light data, temperature data and gas data) related to a garbage level of the garbage container.

Further, based on the predefined communication schedule the gauge communicates with the server to transmit such measurement data. In an example, the predefined schedules can be associated with peak hours of a day or peak days of a month or year, when the gauge should measure and communicate such data to the server.

An example operation of a gauge, having the above operational model, is configured to measure and communicate data to the server at around 10 am on $26^{th}$ of December (after Christmas), when a probability of the garbage container to be filled is substantially high. Similarly, the predefined measurement and communication schedules may relate to all festive or holiday seasons when the probability of the garbage container to be filled is substantially high. In addition to this, the predefined measurement and communication schedules may be associated to weekends instead of week days.

According to an embodiment, the operational model further comprises allowed ranges for measurement data from at least one of the sensors as a function of time. The operational model thus defines allowed ranges of measurement data, for each sensors of the gauge, as a function of time. Therefore, once the measurement data of the sensors is equal to or exceeds the allowed ranges for measurement data, the gauge is instructed to communicate with the server. According to an embodiment, the data is selected from a group consisting of fill rate data, accelerometer data, humidity data, ambient light data, temperature data and gas data.

In an example, the temperature sensor may be configured to have an allowed range of 0-40° C. for an hour. The gauge accordingly would communicate with the server when the temperature sensor senses either a temperature of 40° C. or above for more than an hour, or a temperature of 0° C. or below for more than an hour. Similarly, other sensors such as the fill rate sensor, accelerometer, humidity sensor, ambient light sensor and gas sensor can include allowed ranges for measurement data as a function of time.

The allowed ranges of the measurement data (of the sensors) defined in the operational models are dependent on various factors, such as the garbage container type, location, intended use and the like. For example, a gauge mounted on bigger garbage containers may have higher allowed ranges (of measurement data for the sensors) as compared to smaller garbage containers. Further, a gauge mounted on a garbage container associated with largely populated locality would have lower allowed ranges as compared to a gauge mounted on a garbage container associated with less populated locality.

According to an embodiment, the operational model further comprises at least one measurement data combination triggering communication. The measurement data combination triggering communication acts as a wake-up signal for the microcontroller (that generally remains in a sleep mode) to initiate communication between the gauge and the server. The measurement data combination triggering communication is an indication when two or more sensors measurement data when combined together constitute a value (primarily associated with a fill level of the garbage container) for which a communication should be established between the gauge and the server.

Therefore, according to an embodiment, the at least one measurement data combination comprises measurement data from different sensors. For example, the measurement data combination includes any combination of the fill rate data, accelerometer data, humidity data, ambient light data, temperature data and gas data acquired from fill rate sensor, accelerometer, humidity sensor, ambient light sensor, temperature sensor and gas sensor, respectively.

According to an embodiment, the method further comprises the steps of:
measuring acceleration of the second sensor which second sensor is an accelerometer;
comparing the acceleration data to a baseline;
measuring the fill rate of the container after a pre-defined time, when the acceleration data deviates from the baseline more than a pre-defined percentage; and
communicating the fill rate to the server, if
the fill rate is equal or below the predefined minimum fill rate, indicating that the container has been emptied, and/or
the fill rate is equal or above the predefined maximum fill rate, indicating that the container has been filled.

According to an embodiment, the measurement data combination comprises measurement data from the accelerometer and measurement data representing the fill rate. This latter data comes from the fill rate sensor. In an example, the accelerometer measures acceleration of the lid of the garbage container. The measured acceleration data of the lid is compared with a baseline (allowed range) acceleration data of the operational model. For example, the predefined acceleration data can be set to 3G. Thereafter, the fill rate of the container is measure after a pre-defined time, when the acceleration data deviates from the allowed range. Specifically, when the measured acceleration data excesses 3G, the fill rate of the container is measured a few minutes later. Finally, the fill rate is communicated to the server if the fill rate is equal or above the predefined minimum fill rate, indicating that the container has been filled. Otherwise, the fill rate is communicated to the server if the fill rate is equal or below the predefined maximum fill rate, indicating that the container has been emptied. Additionally, if the measured fill rate is between the predefined maximum and minimum fill rates (indicating that the container is half filled or half emptied), the fill rate is not communicated to the server. This causes the gauge to not communicate with the server.

According to an embodiment, the method comprises, in conjunction with communicating the fill rate to the server, communicating at least part of the measurement data collected since a previous communication. For example, the gauge sends the measurement data collected from the previous communications in addition to a latest fill rate data to server. Additionally, the gauge communicates previous fill rate data and other previous measurement data such as accelerometer data, humidity data, ambient light data, temperature data and gas data (measure by the other sensors of the gauge) to the server.

According to an embodiment, based on the communicated data the server iterates the operational model. Specifically, when the server receives the measurement data from the gauge, the server compares the allowed ranges defined for an existing operational model with the received measurement data. If any deviation in the measurement data and the allowed ranges are found, the server is operable to redefine the existing operational model and generate a new operation model for the gauge based on such deviations. For example, if a delay in the fill rate data is identified, the same delay is considered while designing the new operational model. Accordingly, the new operational model is communicated to the gauge for the operation thereof.

Typically, in the process of designing a new operational model, latest and previous measurement data (associated with the sensors) from the gauge are used. Additionally, new external parameter related to agreement with customer, weather condition and the like may be also considered while designing the new operational model.

According to an embodiment, the system is also configured to monitor and communicate an emptying event of the garbage container. The emptying event may be detected and recorded by the gauge and communicated to the server.

In an example, the emptying event of the garbage container is detected using multiple sensing methods as a time based sequence. For example, if a measured data of the accelerometer exceeds an allowed range as per the operational model, the fill rate sensor (such as the ultrasonic sensor) starts collecting data for a predetermined time. The predetermined time can be about 60 seconds, in which the ultrasonic sensor measures data is a sequence of time intervals each separated by 0.1 to 1 seconds. If the ultrasonic sensor senses oscillations of about 20 seconds, an inference can be made that the emptying event has happened. Alternatively, if the ultrasonic sensor remains fairly static, an inference can be made that the emptying event has not been performed.

The system and method of the present disclosure reduces non-critical communication between a gauge and a server. In a conventional scenario, a gauge typically operates to transmit a measured fill level data on a daily basis and in such a situation energy consumed by the communication (between the gauge and the server) constitutes as much as 80% of the daily energy consumption of the battery. Therefore, in an example scenario, by eliminating 50% of the communication between the gauge and the server, average daily consumption of the battery can be reduced by 40%. This can correspond to increase in a battery life of about roughly 67%. The following calculation can be considered for the above calculated value of the battery life:

Consider,
$Eb$=energy in battery
$Ed$=daily consumption of energy
$Ec$=energy used in communication
$Eo$=energy used for other purposes (microcontroller and/or sensor reading)
$Tb$=battery lifetime in days
$Ecn$=energy used in communication in the disclosed setup
$Edn$=daily consumption of energy in the disclosed setup
Therefore, $$Tb=Eb/Ed$$

$$Ed=Ec+Eo$$

$$Edn=Ecn+Eo$$

If we consider, $$Ecn=0.5*Ec$$

$$Ec=0.8*Ed$$

The ratio of, $Edn/Ed=(Ecn+Eo)/(Ec+Eo)=1.667$ (showing increase in the battery life of about 67%)

It is to be understood that, for the above calculation, power required for communicating an operational model to the gauge is assumed to negligible. Further, the above calculation does not take into account any substantial increase in the microcontroller activity. However, even if the power consumption of the microcontroller is assumed to be increased by 10%, still the battery life is expected to be increased by about 61%.

According to an embodiment, the system of the present disclosure can be employed in other fields, apart from monitoring and communicating a fill rate of a garbage container. Specifically, the system of the present disclosure can be employed in general in any field where a container needs to be either filled or emptied. For example, the system can be implemented to monitor and communicate a fill rate of an oil tank of a fuel station. The gauges of the present disclosure can be attached to the oil tank and measured fill rate data of the oil tank (based on the operational model) is forwarded to an oil delivery firm. This helps the oil delivery firm to make a decision when the oil tank should be refilled and plan and execute the associated logistics efficiently.

The present disclosure provides a system and a method that reduce non-critical communication between a gauge and a server. The reduced communication helps in substantially increasing a battery life of the gauge and makes an entire process of monitoring and communicating a fill rate of a container (such as the garbage container, the oil tank and the like) power efficient. Typically, a battery life of a gauge is ten years in a conventional scenario, based on the system and method of the present disclosure an expected battery life can be increased by for example about 67%. Therefore, a battery with smaller capacity can be used as an alternative. This further make the entire process of monitoring and communicating the fill rate of the container cost efficient. Finally, such fill rate data helps in optimizing logistics, such garbage collection truck or oil truck, used for emptying or filling such container.

DETAILED DESCRIPTION OF THE DRAWINGS

Referring now to the drawings, particularly by their reference numbers, FIG. 1 is a schematic illustration of a garbage container 100. The container 100 primarily includes two parts, i.e., a hollow body 102 and a lid 104 mounted on an upper portion of the hollow body 102. The lid 104 is attached to the hollow body 102 with the help of a hinge 106. The lid 104 includes a handle 106 for the opening and closing of the hollow body 102. The container 100 also includes a gauge 120 attached to an underside of the lid 104. The gauge 120 is operable to measure an amount of material 130 in the hollow body 102, i.e. a fill level of the container 100.

Figure 2:
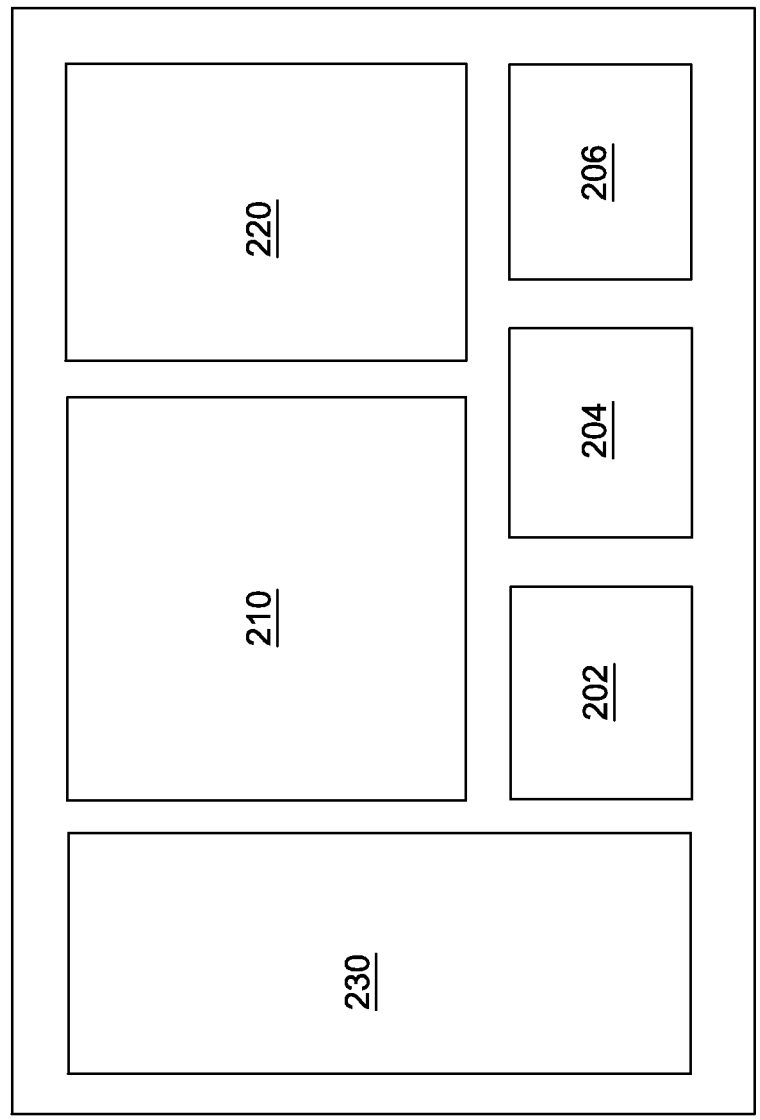
FIG. 2 is a schematic illustration of a gauge architecture; in accordance with an embodiment of the present disclosure.

FIG. 2 is a schematic illustration of a gauge architecture, in accordance with an embodiment of the present disclosure. The gauge 120 includes a first sensor 202, such as a fill rate sensor. The gauge 120 also includes a second sensor, such as sensors 204 and 206. The gauge 120 further includes a microcontroller 210 with embedded memory for a program code, data storage and a clock function (typically a real time clock). The gauge 120 also includes a wireless transceiver 220 having antenna operable on GSM or similar cellular standard. The gauge 120 further includes a power source 230, such as a battery, for providing electrical power to the sensors 202, 204, 206, the microcontroller 210 and the wireless transceiver 220.

Figure 3:
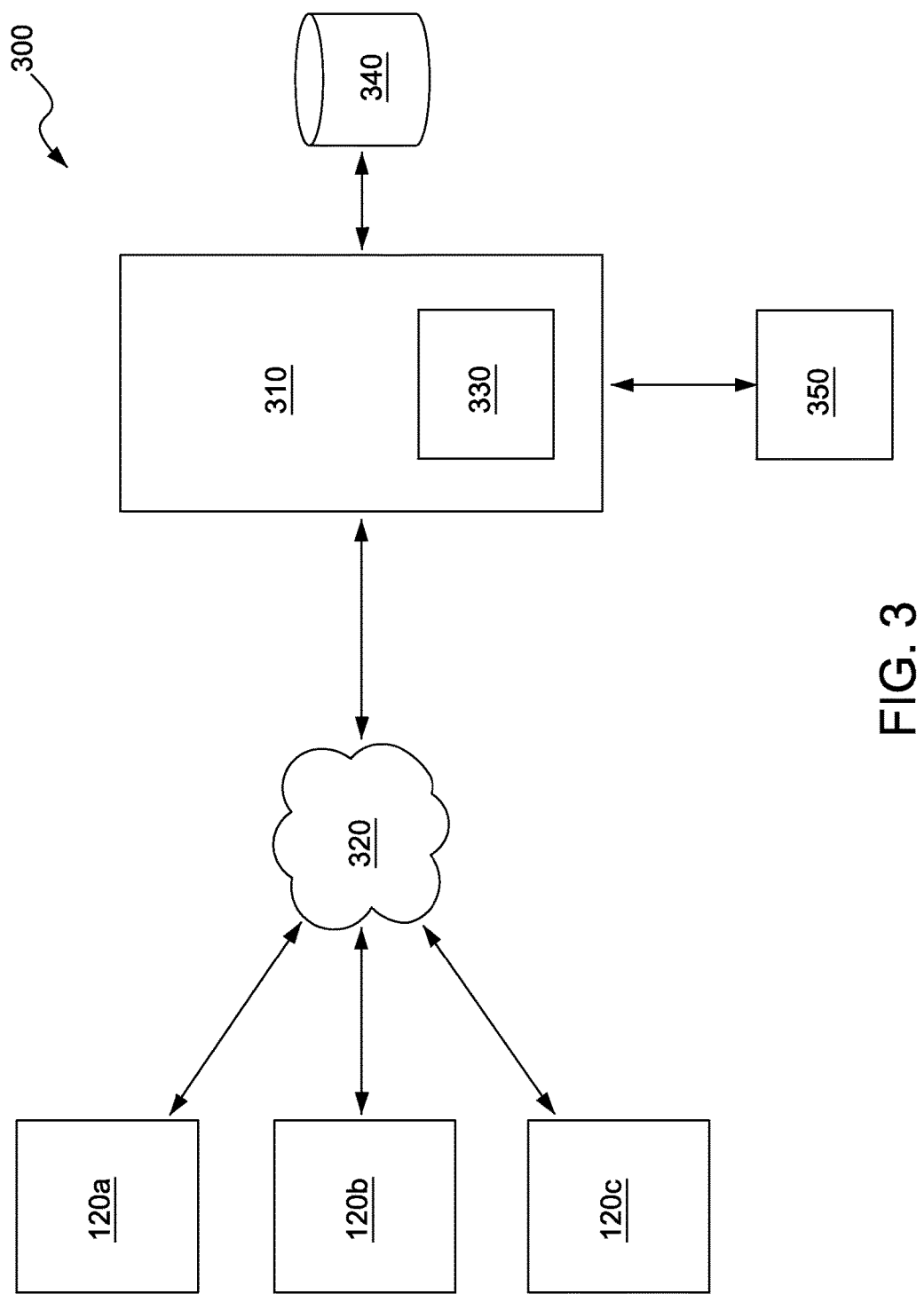
FIG. 3 is a schematic illustration of a system for monitoring and communicating a fill rate of garbage containers, in accordance with an embodiment of the present disclosure.

Referring now to FIG. 3, a schematic illustration of a system 300 for monitoring and communicating a fill rate of garbage containers is illustrated, in accordance with an embodiment of the present disclosure. The system 300 includes at least one gauge, such as the gauges 120a, 120b and 120c. Those skilled in the art would recognize that the gauges 120a, 120b and 120c are similar to the gauge 120 (explained in conjunction with the FIGS. 1 and 2) and attached to containers, such as the container 100.

The system 300 also includes a server 310. The server 310 is coupled with the gauges 120a, 120b and 120c via a communication network 320. The server 310 includes a program code 330 and a database 340. The program code 330 makes the server 310 to connect with the gauges 120a, 120b and 120c for exchanging data therebetween. The database 340 of the server 310 is configured to store received data therein.

Further, the server 310, particularly the program code 330 thereof, makes the server 310 operable to provide operational models to the gauges 120a, 120b and 120c. Those skilled in the art would recognize that the operational models provided to the gauges 120a, 120b and 120c are different from each other. The server 310 is operable to start a communication session between the gauges 120a, 120b and 120c and the server 310, based on the operational models. The gauges 120a, 120b and 120c of the system 100 are designed for low power operation. Specifically, the microcontrollers of the gauges 120a, 120b and 120c generally stay in sleep mode until the microcontrollers receive a wake-up signal from at least one of the sensor or the clock function. The wake-up signal is primarily associated with allowed ranges of at least one of the sensor data or the clock function defined by the operational models.

The gauges 120a, 120b and 120c accordingly communicate with the server 310 for transmitting the measurement data of the sensors. The measurement data is primarily associated with the fill rate of the containers. The server 310 analyzes the measurement data to make changes in the existing operational models or to design new operational models for the gauges 120a, 120b and 120c.

The system 300 also includes a user device 350 operatively coupled to the server 310. The user device 350 is operable to control the server 310 and exchange data with the server 310. The server 310 provides a user interface on the user device 350 for controlling and monitoring the operation of the server 310.

Figure 4:
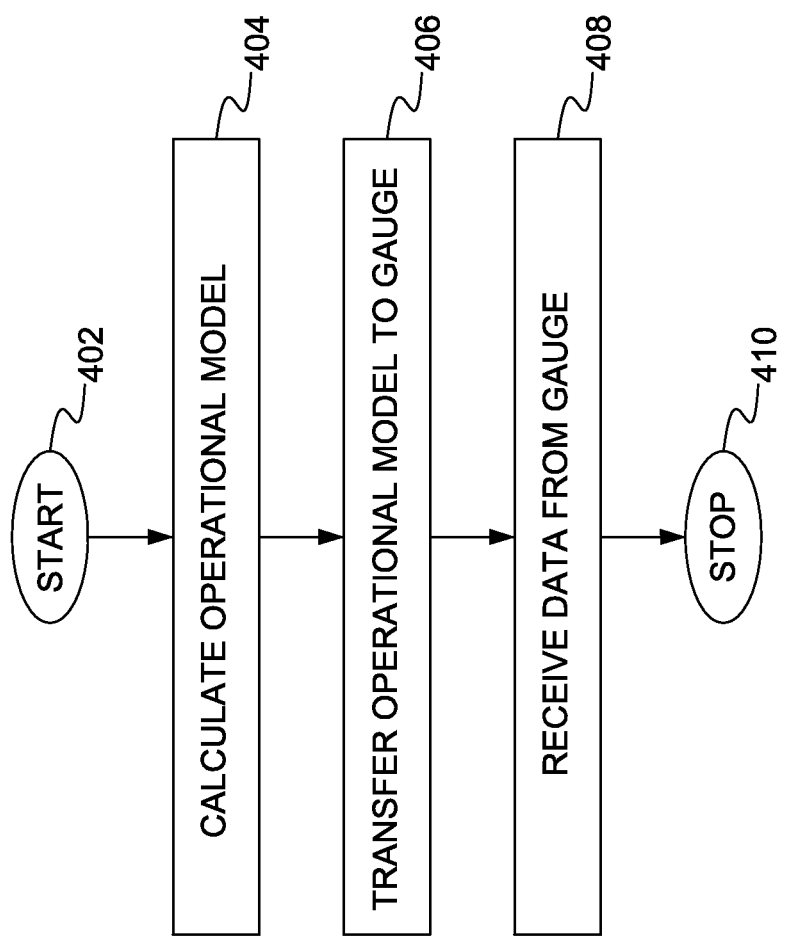
FIG. 4 is an illustration of steps of a method of a server operation, in accordance with an embodiment of the present disclosure.

Referring now to FIG. 4, illustrated are steps of a method 400 of a server operation, in accordance with an embodiment of the present disclosure. Those skilled in the art would recognize that the method 400 illustrates steps involved in the operation of the server 310 of the FIG. 3.

The method 400 initiates at step 402. Following step 402, at step 404, the server calculates an operational model for a gauge.

At step 406, the server transfers (or provides) the operational model to the gauge. The operational model instructs how the gauge should operate, i.e. to establish only required or essential communication between the gauge and the server.

At step 408, the server receives data from the gauge. Once the communication is established between the gauge and the server, the gauge transmits measurement data (of the sensors) to the server. Then at step 410, the method 400 terminates.

Figure 5:
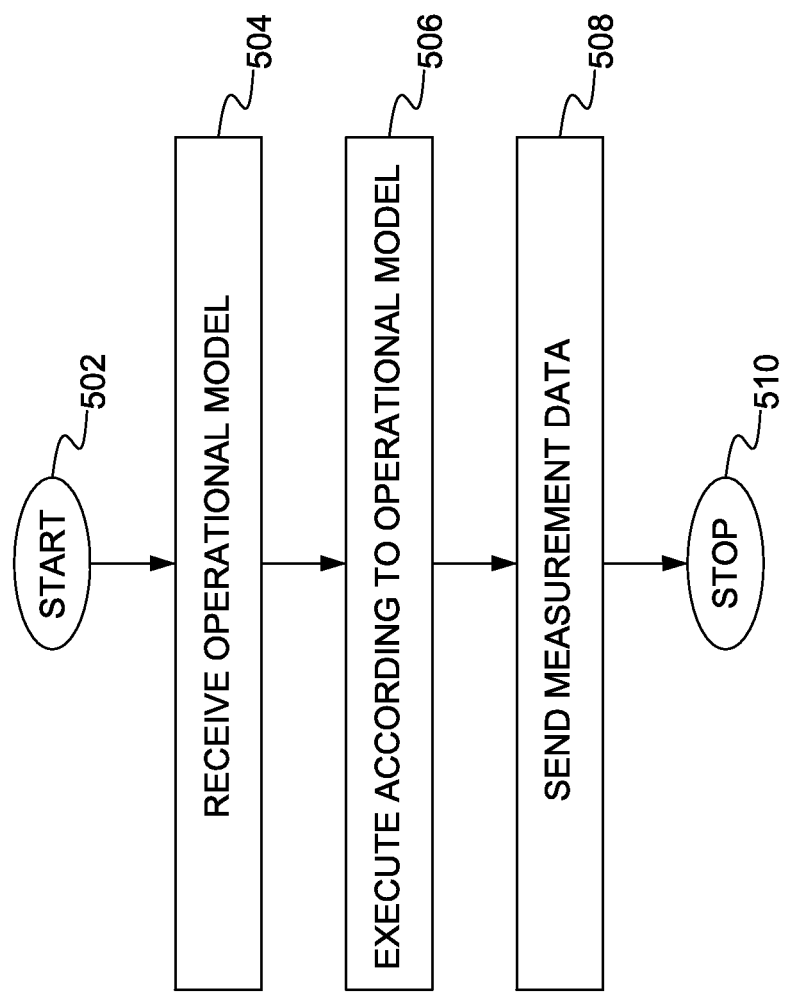
FIG. 5 is an illustration of steps of a method of a gauge operation, in accordance with an embodiment of the present disclosure.

Referring now to FIG. 5, illustrated are steps of a method 400 of a gauge operation, in accordance with an embodiment of the present disclosure. Those skilled in the art would recognize that the method 500 illustrates steps involved in the operation of the gauge 210 explained in conjunction with the FIGS. 1-3.

The method 500 initiates at step 502. Following step 502, at step 504, a gauge receives an operational model. The operational model is provided and designed by a server, operatively coupled to the gauge.

At step 506, the gauge executes according to the operational model. The operational model instructs the gauge to communicate with the server.

At step 508, the gauge sends measurement data to the server. The measurement data includes data sensed by sensors of the gauge. Then at step 410, the method 400 terminates.

Figure 6:
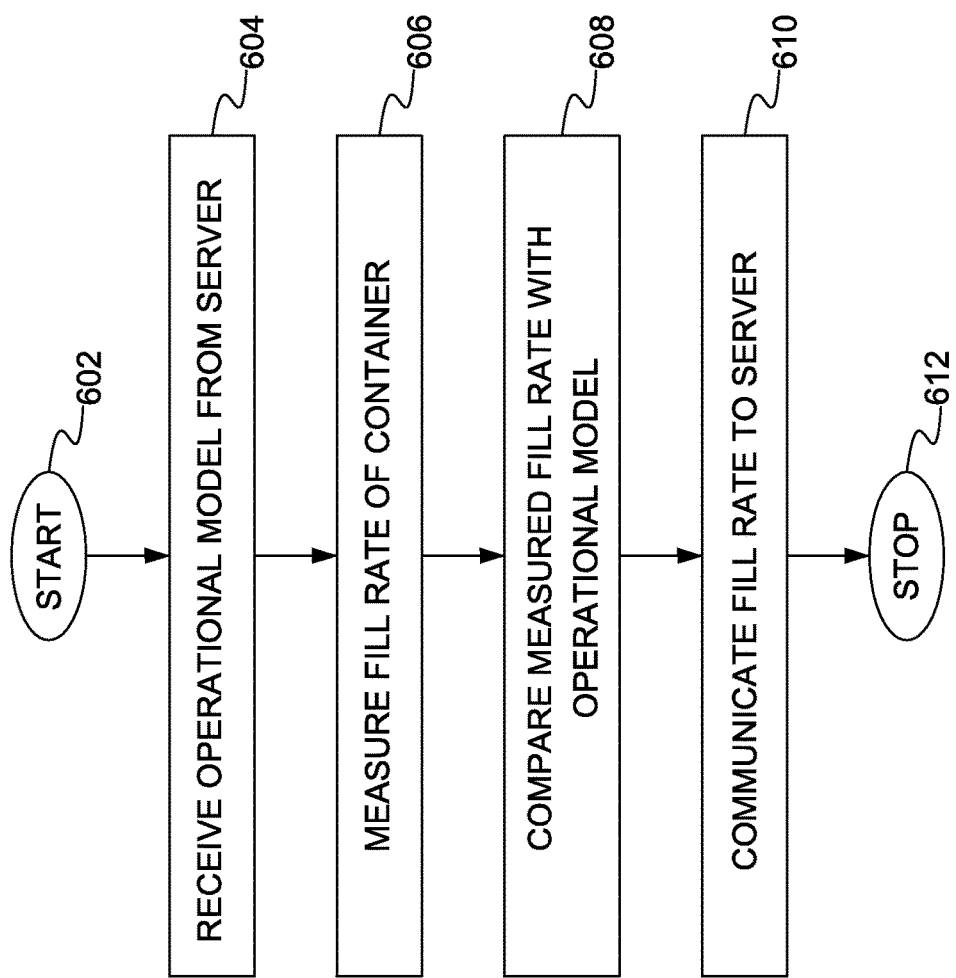
FIG. 6 is an illustration of steps of a method for monitoring and communicating a fill rate of a container, in accordance with an embodiment of the present disclosure.

Referring now to FIG. 6, illustration of steps of a method 600 for monitoring and communicating a fill rate of a container is shown, in accordance with an embodiment of the present disclosure. The container is configured to include at least a first sensor which is a fill rate sensor.

The method 600 initiates at step 602. Following step 602, at step 604, the gauge receives an operational model from a server. The operational model includes a predefined maximum and/or minimum value of the fill rate for the fill rate sensor.

At step 606, the fill rate sensor measures a fill rate of the container.

At step 608, the gauge, particularly a microcontroller thereof, compares the measured fill rate calculated by the fill rate sensor with the predefined maximum and/or minimum value of the fill rate defined by the operational model.

At step 610, the gauge, particularly a transceiver thereof, communicates the fill rate to the server if the fill rate is equal or above the predefined maximum fill rate, and/or the fill rate is equal or below the predefined minimum fill rate. Then at step 612, the method 600 terminates.

The steps 602 to 612 are only illustrative and other alternatives can also be provided where one or more steps are added, one or more steps are removed, or one or more steps are provided in a different sequence without departing from the scope of the claims herein. For example, in addition to communicating the fill rate to the server, at least part of the measurement data collected since a previous communication is communicated to the server. Further, based at least on the communicated data the server iterates the operational model for the gauge.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for measuring a fill rate of a container and communicating the measured fill rate to a server, the container comprising a gauge affixed to the container, the gauge comprising a fill rate sensor configured to measure the fill rate of the container, a microcontroller communicatively coupled to the fill rate sensor and a transceiver device, the microcontroller and the transceiver device being in a normally non-active mode, the method comprising:

the gauge receiving and storing an operational model from the server, the operational model defining in the gauge:
  a communication schedule for communication from the gauge to the server;
  a pre-determined fill rate level for the container, the pre-determined fill rate level defining a predefined maximum value of the fill rate and a predefined minimum value of the fill rate; and
  a wake-up signal for the gauge, the wake-up signal configured to initiate a communication comprising the measured fill rate from the gauge to the server outside of the communication schedule, wherein the wake-up signal is generated when the measured fill rate is equal to or above the predefined maximum value of the fill rate or is equal to or below the predefined minimum value of the fill rate, the method further comprising the fill rate sensor:
measuring the fill rate of the container;
comparing the measured fill rate with the pre-determined fill rate level defined in the operational model; and
generating the wake-up signal to switch on the microcontroller and the transceiver device from the normally non-active mode to a transmitting mode in order to cause the gauge to transmit the communication comprising the measured fill rate to the server only if:
  the measured fill rate is equal to or above the predefined maximum value of the fill rate defined in the operational model; or
  the measured fill rate is equal to or below the predefined minimum value of the fill rate defined in the operational model; and
receiving an updated operational model from the server in response to the transmitted communication comprising the measured fill rate, the updated operational model being used as the operational model for the gauge.

2. The method according to claim 1, wherein the fill rate sensor is selected from the group consisting of an ultrasonic sensor, an infrared sensor, a pressure sensor, a weight sensor, an ultra wideband radar sensor, a CCD camera sensor and a laser sensor.

3. The method according to claim 1, wherein the container further comprises at least a second sensor, and the method further includes:
measuring an acceleration of the second sensor, the second sensor comprising an accelerometer and the measured acceleration comprises acceleration data;
comparing the acceleration data to a baseline;
measuring the fill rate of the container after a pre-defined time has elapsed from the measurement of the acceleration of the second sensor and the acceleration data deviates from the baseline by more than a pre-defined percentage value; and generating a wake-up signal to switch on the microcontroller and the transceiver device to communicate the fill rate measured after the pre-defined time to the server, if
  the fill rate measured after the pre-defined time is equal to or below the predefined minimum value of the fill rate, indicating that the container has been emptied, and/or
  the fill rate measured after the pre-defined time is equal to or above the predefined maximum value of the fill rate, indicating that the container has been filled.

4. The method according to claim 1, wherein the operational model further defines a predicted fill rate of the container as a function of time.

5. The method according to claim 4, wherein the operational model further defines allowed ranges for measurement data from at least one other sensor as a function of time.

6. The method according to claim 5, wherein the measurement data from the at least one other sensor is selected from a group consisting of accelerometer data, humidity data, ambient light data, temperature data and gas data.

7. The method according to claim 1, wherein the operational model further defines at least one measurement data combination configured to generate the wake-up signal, wherein the at least one measurement data combination comprises measurement data from different sensors.

8. The method according to claim 7, wherein the at least one measurement data combination comprises measurement data from an accelerometer and measurement data representing the fill rate.

9. The method according to claim 1, comprising, in conjunction with transmitting the communication comprising the measured fill rate to the server, communicating at least part of measured fill rate data collected since a previous communication.

10. The method according to claim 9, wherein the server updates the current operational model based at least on the measured fill rate and the measured fill rate data collected since the previous communication that is communicated to the server.

11. A system for measuring and communicating a fill rate of a container, the system comprising:
  a gauge mounted on the container, the gauge comprising a fill rate sensor configured to measure the fill rate of the container, a microcontroller communicative coupled to the fill rate sensor and a transceiver, the microcontroller and the transceiver being in a normally non-active mode; and
  a server communicably coupled to the gauge to provide an operational model to the gauge, the operational model defining in the gauge:
    a communication schedule for communication from the gauge to the server;
    a pre-determined fill rate level for the container, the pre-determined fill rate level defining a predefined maximum value of the fill rate and a predefined minimum value of the fill rate;
    a wake-up signal for the gauge, the wake-up signal configured to initiate a communication comprising the measured fill rate from the gauge to the server outside of the communication schedule, wherein the wake-up signal is generated when the measured fill rate is equal to or above the predefined maximum value of the fill rate or is equal to or below the predefined minimum value of the fill rate;
  wherein, based on the operational model the gauge is configured to measure the fill rate of the container with the fill rate sensor,
    compare the measured fill rate with the pre-determined fill rate level defined in the operational model, and
    generate the wake-up signal to cause the microcontroller and the transceiver to switch from the normally non-active mode to an active state in order for the gauge to transmit the communication comprising the measured fill rate to the server only if:
      the measured fill rate is equal to or above the predefined maximum value of the fill rate defined in the operational model, or
      the measured fill rate is equal to or below the predefined minimum value of the fill rate defined in the operational model; and
      receiving an updated operational model from the server in response to the transmitted communication comprising the measured fill rate, the updated operational being used as the operational model for the gauge.

12. The system according to claim 11, wherein the fill rate sensor is selected from the group consisting of an ultrasonic sensor, an infrared sensor, a pressure sensor, a weight sensor, an ultra wideband radar sensor, a CCD camera sensor and a laser sensor.

13. The system according to claim 11, wherein the container further comprises at least a second sensor, the second sensor comprising an accelerometer and measured acceleration comprises acceleration data;
  wherein the second sensor is configured to:
  compare the acceleration data to a baseline and cause the fill rate sensor to measure the fill rate of the container after a pre-defined time has elapsed from the measurement of the acceleration of the second sensor and the acceleration data deviates from the baseline by more than a pre-defined percentage value; and
  generate a wake up signal to cause the microcontroller and the transceiver to enable the gauge communicate the fill rate measured after the pre-defined time to the server, if the fill rate measured after the pre-defined time is equal to or below the predefined minimum value of the fill rate, indicating that the container has been emptied, and/or the fill rate measured after the pre-defined time is equal to or above the predefined maximum value of the fill rate, indicating that the container has been filled.

14. The system according to claim 11, wherein the operational model further defines a predicted fill rate of the container as a function of time.

15. The system according to claim 14, wherein the operational model further defines allowed ranges for measurement data from at least one other sensor as a function of time.

* * * * *